United States Patent  [15] 3,658,315
Boucherie  [45] Apr. 25, 1972

[54] DEVICE FOR PNEUMATICALLY CLAMPING PIECES OF WORK IN TRANSFER MACHINES OR SUCHLIKE

[72] Inventor: Gerard Benoni Boucherie, Potaardestraat 1, Rumbeke, Belgium

[22] Filed: June 12, 1969

[21] Appl. No.: 832,682

[30] Foreign Application Priority Data

June 27, 1968 Belgium ............................. 717.208

[52] U.S. Cl. .............................. 269/20, 91/432, 198/179, 214/1 BB, 269/56
[51] Int. Cl. ............................................. B23q 3/08
[58] Field of Search ................ 214/1 BB, 38.20; 269/20, 24, 269/30, 56; 91/432

[56] References Cited

UNITED STATES PATENTS

| 1,618,633 | 2/1927 | Bennett | 91/432 X |
| 3,157,299 | 11/1964 | Ingham | 214/38.2 X |

FOREIGN PATENTS OR APPLICATIONS

| 975,920 | 1964 | Great Britain | 91/432 |

Primary Examiner—Andrew R. Juhasz
Attorney—Richards & Geier

[57] ABSTRACT

The present invention is concerned with a device which permits the pneumatic clamping of workpieces or the like upon transfer machines whereby no moving air hoses are required.

4 Claims, 9 Drawing Figures

PATENTED APR 25 1972
3,658,315
SHEET 1 OF 5
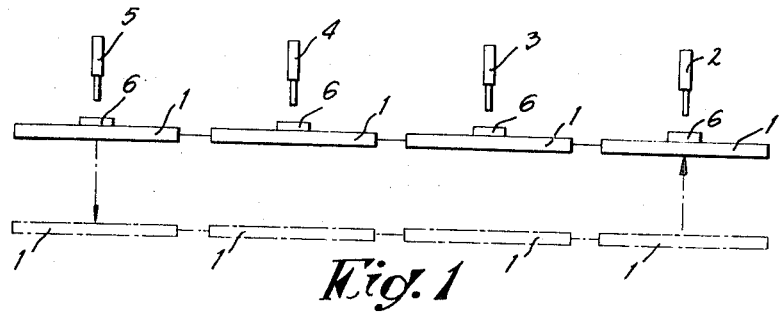
*Fig. 1*
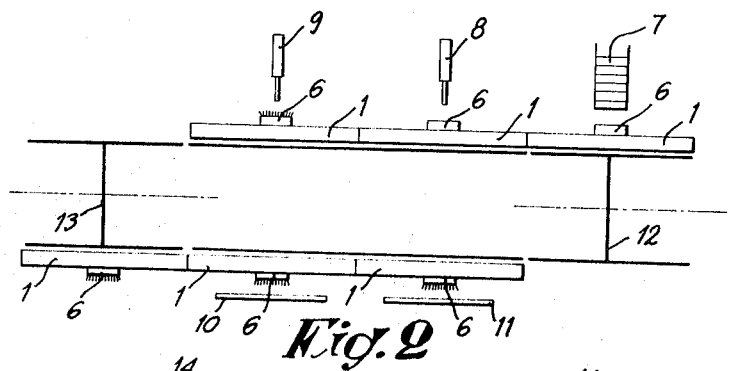
*Fig. 2*
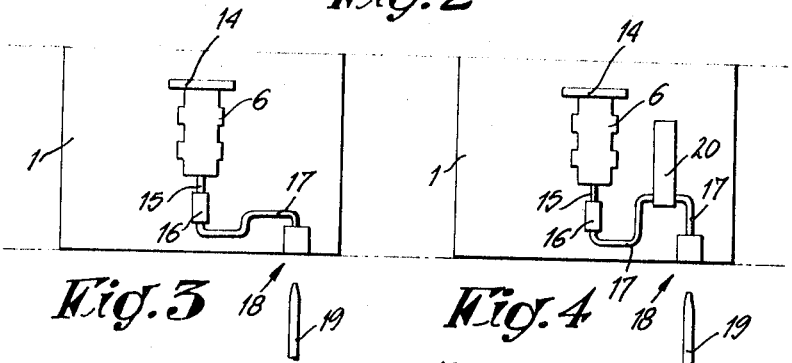
*Fig. 3*   *Fig. 4*
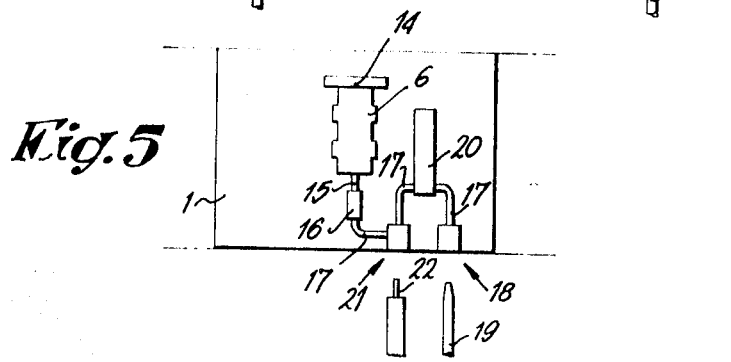
*Fig. 5*
GERARD BENONI
BOUCHERIE
INVENTOR.
BY Richards & Geier
ATTORNEYS

GERARD BENONI
BOUCHERIE
INVENTOR.

BY Richards+Geier
ATTORNEYS

GERARD BENONI
BOUCHERIE
INVENTOR.

BY Richard & Geier

ATTORNEYS

GERARD BENONI
BOUCHERI
INVENTOR.

BY Richards & Geier

ATTORNEYS

DEVICE FOR PNEUMATICALLY CLAMPING PIECES OF WORK IN TRANSFER MACHINES OR SUCHLIKE

The present invention is concerned with a device for pneumatically clamping the tools of transfer machines or the like.

It is well known that in the case of transfer machines or the like the workpieces are displaced from one location of operation to another in order to be subjected to various operations, whereby these workpieces must be maintained in position during the operation as well as during the displacements from one operation location to another, so that the operations may be carried out upon the various locations of one and the same workpiece, whereby these various locations are determined with precision with respect to each other. For this purpose for instance, such workpieces are fixed upon workpiece holders which are themselves applied to so-called transfer trucks, slides, or the like.

An example of such a transfer machine can for instance be found in the fabrication of brushes, such as described amongst others in the U.S. Pat. application Ser. No. 648,349 of the same applicant and now U.S. Pat. No. 3,511,540 issued May 12, 1970.

The clamping of the workpieces in the workpiece holder can be carried out mechanically, electromechanically, hydraulically, pneumatically or in any other appropriate manner.

The present invention is concerned with a pneumatic clamping of such workpieces in transfer machines.

As is generally known, the pneumatic clamping of workpieces is extremely rational and can be carried out fast and efficiently, due to the fact that use can be made of compressed air cylinders, respectively pneumatic jacks, which by means of appropriate control valves can assure the clamping and the releasing of the workpieces at the appropriate time.

It has already been tried, in the case of such transfer machines, to provide the compressed air supply by making use of air hoses leading from the fixed part of the machine to each of the transfer trucks, slides, shackles and the like. Since such trucks, shackles or the like have to be displaced for each operation, it is however necessary for these hoses to be displaced at the same time. This obviously greatly restricts the possibilities, thus practically eliminating the main advantages of transfer machines, namely a great flexibility and unlimited possibilities.

The present invention has for its object the provision of a device which permits the pneumatic clamping of workpieces or the like upon transfer machines whereby no moving air hoses are required.

For this purpose the device for pneumatically clamping of workpieces on transfer machines and the like mainly consists of at least one connector or distributor block per truck, slide or the like, from which a pipe feeds the jack, and at least one connection attached to a fixed part of the machine and connected to a source of compressed air, and which can co-operate successively with the distributor blocks of the various trucks or the like.

In order to indicate more clearly the characteristics of the present invention, a preferred form of embodiment of such a clamping device will be described hereafter, merely as an example and without any character of limitation, with reference to the appended drawings in which:

FIG. 1 schematically shows the general principle of a transfer machine;

FIG. 2 also schematically shows the principle of a transfer machine as used for instance for the fabrication of brushes;

FIG. 3 gives a schematic top view of a transfer truck, slide or the like equipped with a pneumatic clamping device according to the invention;

FIGS. 4 and 5 show similar views to that of FIG. 3, but in which the clamping device is each time further developed;

Figure 6:
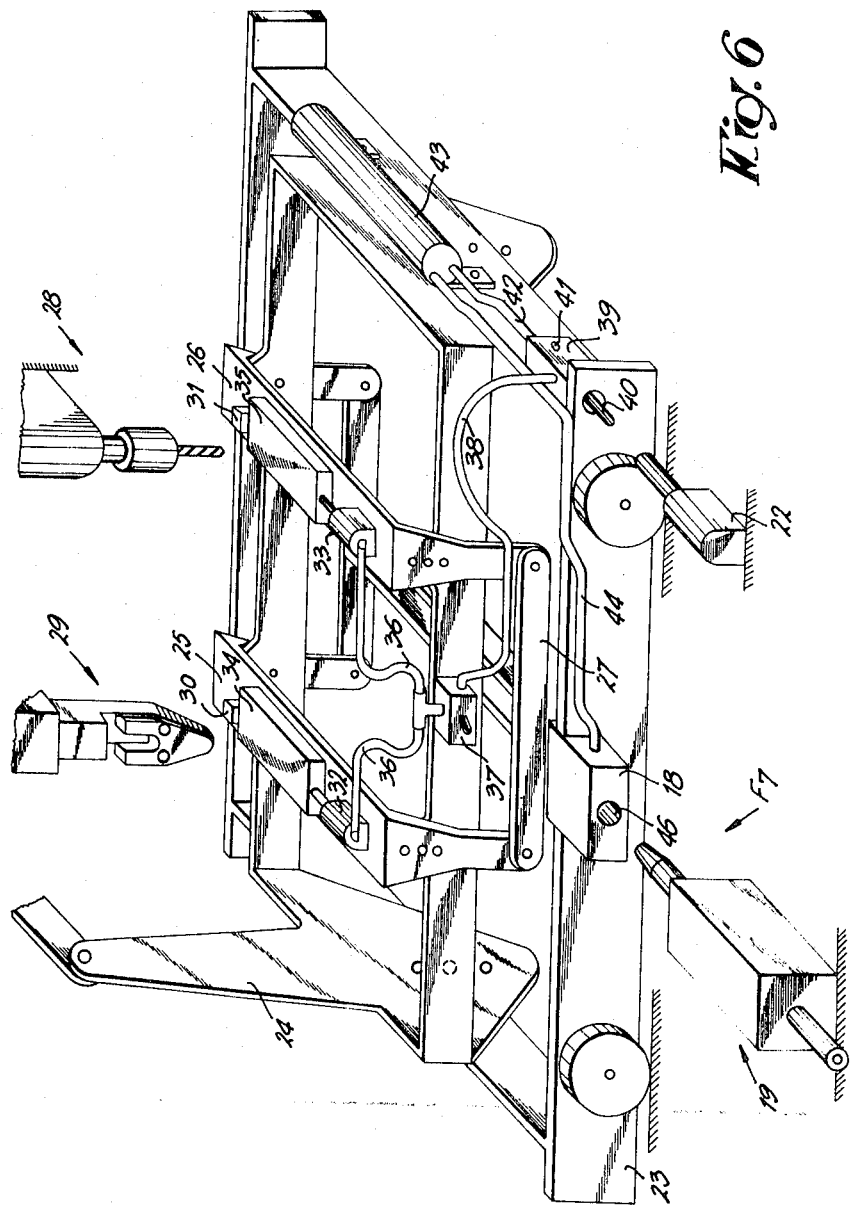
FIG. 6 represents a perspective view of a transfer truck of a transfer machine such as is used for the fabrication of brush machines and which is equipped with a clamping device according to the present invention.

FIG. 1 schematically shows a transfer machine, in which various trucks, slides, shackles or the like 1 are successively moved under tools, respectively 2-3-4 and 5, which each carry out a different operation upon the workpiece 6 which is fixed to the truck or the like 1. The trucks 1 are moved in an appropriate manner from under any one determined tool 2 to 5 towards the next one until finally, after the workpiece 6 has been subjected in the present case to the four operations, the workpiece is delivered.

Trucks 1 are successively and simultaneously displaced by the same distance, whereby these displacements must always correspond precisely to the distance between the various tools 2 to 5, which themselves are located at mutual distances which are identical amongst each other, in order to provide that the various operations upon a workpiece 6 are effected in the correct place with respect to the preceding operation.

FIG. 2 schematically shows a transfer machine which makes use of independent trucks 1 upon which a workpiece 6, for instance the body of a brush, is fixed and whereby this brush body must successively be displaced under a magazine 7, a drilling tool 8, a filling tool 9, a combing device 10 and a cutting device 11. In this form of embodiment the trucks 1 are displaced along the top side of the machine from right to left by pushing each other, while the same occurs at the bottom side of the machine, but from left to right. The transfer of the lower truck to the top side of the machine and of the top truck towards the under side of the machine is carried out by means of drums, 12 and 13. In the case of such transfer machines it is necessary that workpiece 6 be clamped in a very simple way with respect to trucks 1 and that this clamping remains assured during the entire duration of the various operations.

According to the present invention, when the workpiece is applied to the truck or the like, this workpiece will be clamped by means of a pneumatic jack, whereby this jack is fed by a source of compressed air which in this position is being connected to the pneumatic jack under consideration, the air pressure being evacuated from this jack in order to release the workpiece as soon as the latter has undergone the various operations. This is however only possible in theory as there always exist air pressure losses, so that in practice there must be provided for said pneumatic jacks during each stop of the various trucks, slides or the like, a connection between each truck, respectively pneumatic jack, and the source of compressed air in order to compensate these losses.

According to the present invention, advantage is thus taken of the stop of various trucks or the like for maintaining the pressure in the clamping cylinders.

In FIG. 3 a transfer truck, shackle or the like 1 is schematically represented, upon which a workpiece 6 is applied and whereby this workpiece 6 is fixed upon trucks 1 between a fixed support 14 and the free end of a piston rod 15 of a pneumatic jack 16. The latter is connected by means of an appropriate pipe 17 to a distributor block 18 which can co-operate with a connector 19. The latter is connected to a source of compressed air, and can, when truck 1 is in the required location, be applied into distributor block 18 so as to feed cylinder 16 and clamp the workpiece.

Such a connector 19 will be provided practically at each location where the workpiece has to be subjected to an operation, in order to maintain constant the pressure in cylinders 16.

In FIG. 4, an air tank 20 has been installed in pipe 17, between distributor block 18 and cylinder 16, so that even during the displacement of truck 1 eventual air pressure losses can be compensated. In this case, tank 20 is being topped up at each stop by means of elements 18 and 19.

In FIG. 5 there is finally provided in pipe 17, between tank 20 and air pressure cylinder 16, a valve 21 which, after all operations have been effected upon workpiece 6, can co-operate with a pin 22, for instance the free extremity of the piston rod of the air pressure cylinder, in order to evacuate the air pressure from cylinder 16 and consequently release workpiece 6. This valve obviously closes off at this moment the air passage from tank 20 to cylinder 16.

FIG. 6 shows schematically and in perspective a form of embodiment of a transfer truck, such as may be used for instance in a machine for making brushes. Such a truck 1 consists of an actual framework 23 which can be displaced by means of wheels along an appropriate guiding device and in which, as is generally known, a frame 24 which is adjustable with respect to various pivoting points, is freely suspended so as to be able to hinge. Upon this frame 24, the actual workpiece holders, respectively 25 and 26, are also hingedly attached and adjustable according to various pivoting points, while they are connected with each other by means of an intermediate link 27.

In this manner workpiece holders are produced which are fitted in such manner that they can impart rocking movements to the workpiece around two axes which are perpendicular to each other. Finally a drilling tool 28 and a filling tool 29 are schematically represented.

The device according to the invention consists in this case mainly of support blocks respectively 30 and 31, which are applied to the workpiece holders 25 and 26, and of air pressure cylinders respectively 32 and 33, which are also fitted to the work holders and which permit the clamping in this case of brush bodies, respectively 34 and 35 between said supports 30 and 31 on the one hand, and the respective air pressure cylinders 32 and 33 on the other hand.

Air pressure cylinders 32 and 33 are each connected by a pipe 36 with a hand controlled valve 37 which is normally open. The latter is connected by means of a pipe 38 to a control valve 39 of which the control pin 40 protrudes outside the frame 23 of truck 1. This control valve has an exhaust opening 41 on the one hand, and is, on the other hand connected by means of pipe 42 to an air tank 43 which itself is connected to said distributor block 18 by means of a pipe 44. In front of said distributor block 18, connector 19 is schematically represented, while the air pressure cylinder 22 is shown opposite the operating pin 40 of control valve 39.

Figure 7:
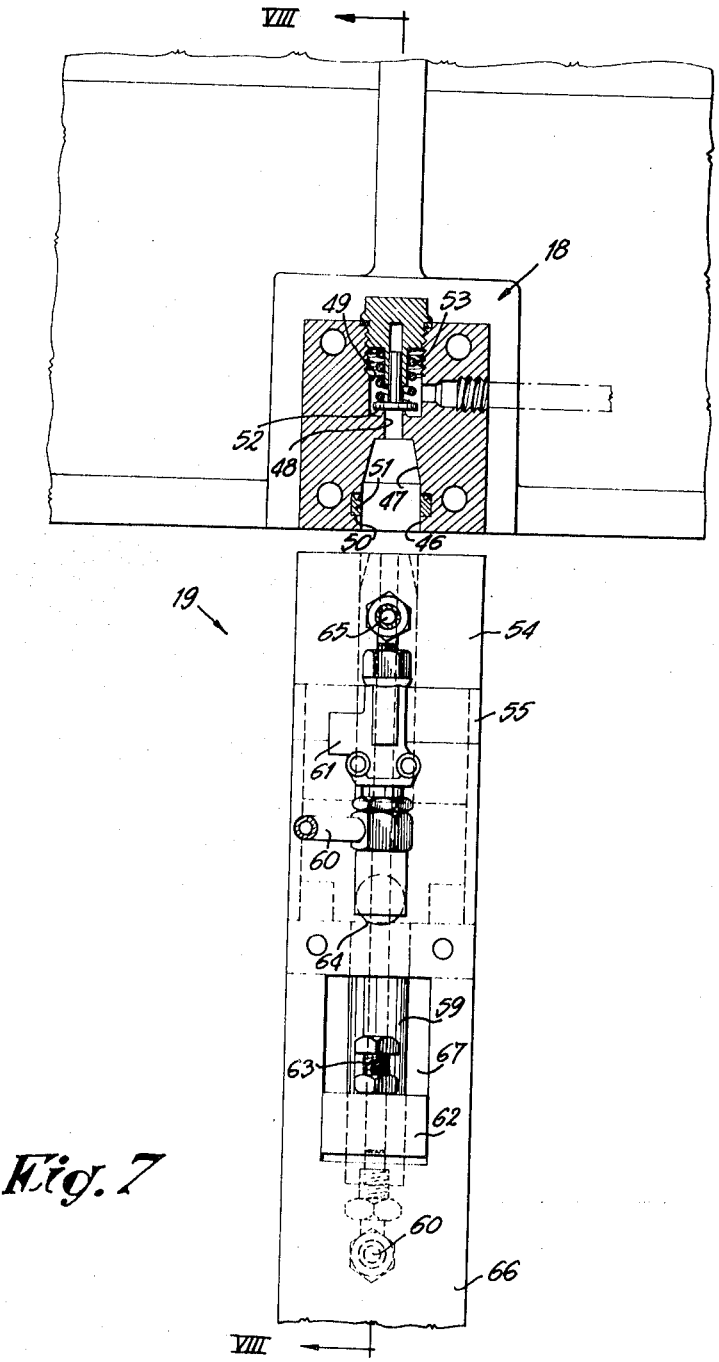
FIG. 7 shows a top view with partial cross-section of a form of embodiment of an actual connection between the transfer truck and the compressed air supply, more particularly of that part which is indicated by F7 in FIG. 6.
Figure 8:
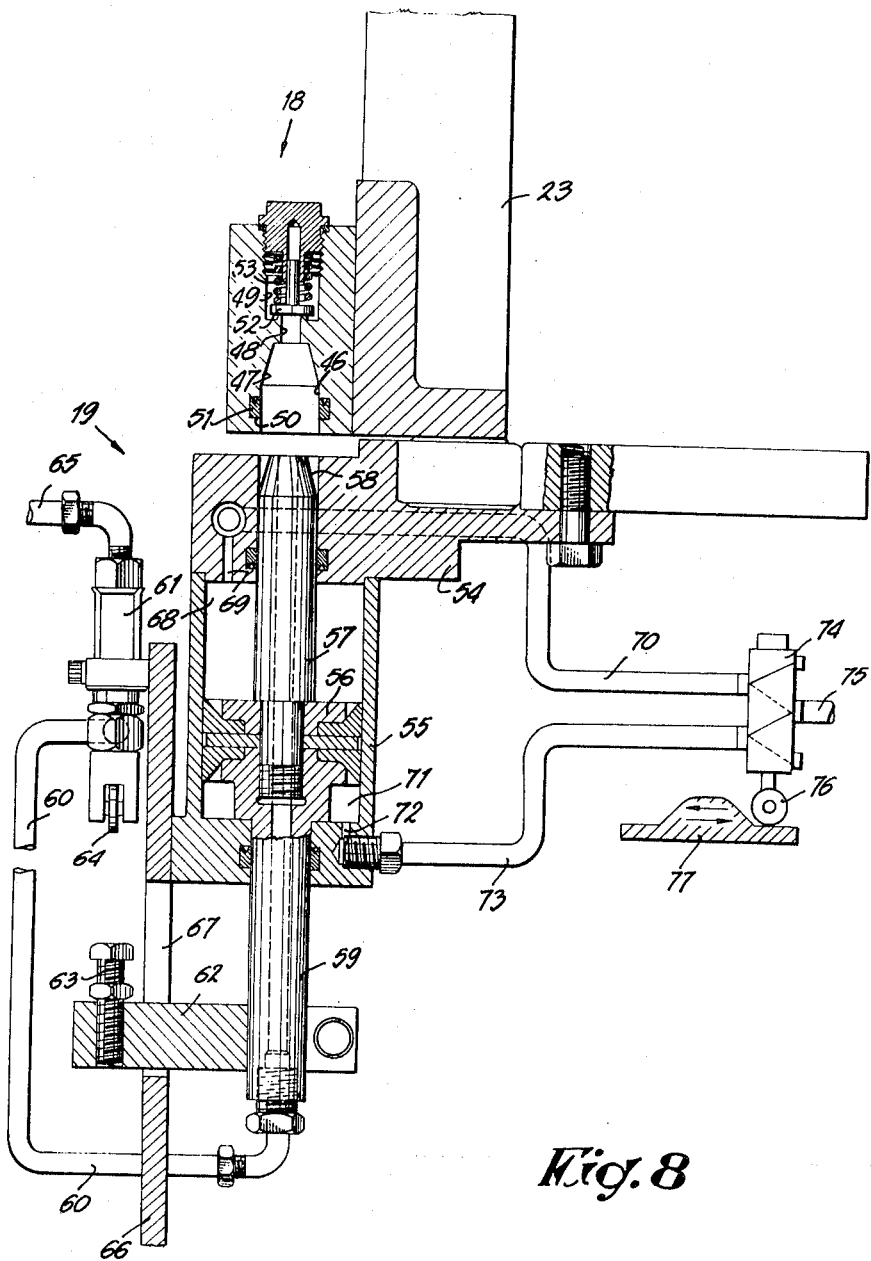
FIG. 8 is a cross-section according to line VIII—VIII of FIG. 7.
Figure 9:
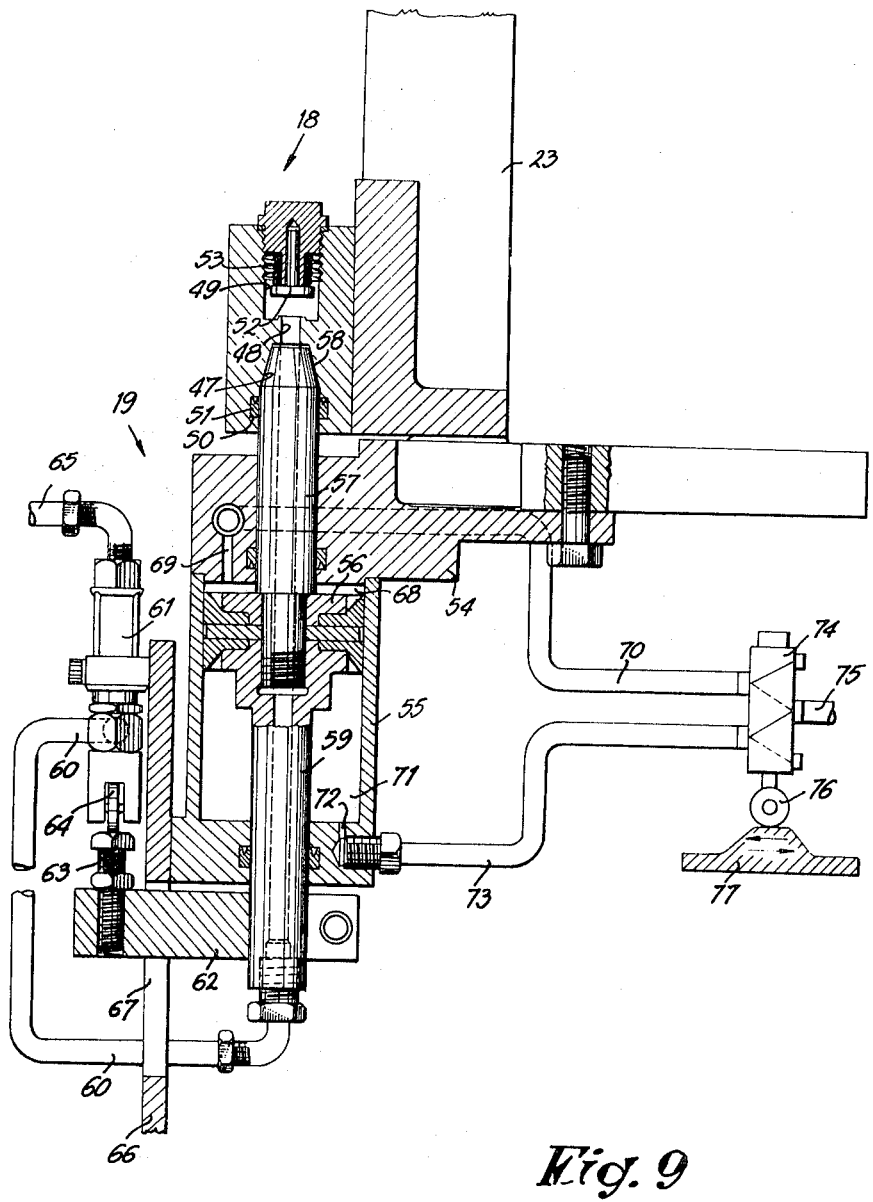
FIG. 9 is a view similar to that of FIG. 8, but after the connection between the transfer truck and the air supply has been brought about.

Distributing block 18 and connector 19 are shown with greater detail in FIGS. 7, 8 and 9.

In distributor block 18, a cylindrical opening 46 is provided opposite connector 19 and is internally extended by a conical part 47 which itself leads by means of passage 48 into chamber 49 into which also leads said pipe 44. In aforesaid cylindrical part 46 there is also provided a sealing ring 51 in a groove 50, while a nonreturn valve 52 is provided in chamber 49 and normally maintains the opening of said passage 48 closed by means of an appropriate spring 53.

Connector 19 mainly consists of a body 54, of which part 55 is provided with a cylindrical bore into which is fitted a piston 56. The latter is hollow and is extended in the direction of distributor block 18 by a hollow rod 57 which has a conical extremity 58 corresponding exactly to said conical part 47 of distributor block 18, while the external diameter of the hollow rod 57 corresponds exactly to bore 46. Piston 56 is extended at its other extremity by an equally hollow rod 59, connected by means of a flexible hose 60 to a valve 61. Upon hollow rod 59 a support 62 is clamped at an appropriate distance from cylinder body 55 and is provided with an adjustable stop 63, which can co-operate with said valve 61 which is provided for this purpose with a control wheel 64. Valve 61 is constantly connected by means of pipe 65 with a source of compressed air. Control valve 61 is fixed to an appendix 66 of said body 54 in which a groove 67 is provided, thus permitting the displacement of said support 62.

Space 68 above piston 56, is connected through passage 69 to pipe 70, while space 71 under the piston is connected by means of passage 72 to pipe 73. Pipes 70 and 73 are connected to a control valve 74 which itself is connected to the source of compressed air by means of pipe 75.

Control valve 74 is provided with an actuating wheel 76 which can co-operate in an appropriate manner with a programming cam 77.

The operation of the device as represented in FIGS. 6 to 9 is very simple and as follows.

After the transfer truck has been brought under any particular tool, the truck is firmly maintained in this position in an appropriate manner. At this moment cam 77 is displaced, which can for instance be done by means of an air pressure cylinder which is not shown and which is controlled by an electro-pneumatic valve, itself controlled by a microswitch or similar device which is depressed in this position by the truck, whereby cam 77 is placed in the location as shown in FIG. 9. In this case valve 74 admits air pressure via pipe 73 into space 71 of cylinder 55, whereby piston 56 as well as piston rods 57 and 59 are displaced. By means of this displacement, hollow rod 57 enters passage 56 of distributor block 18 whereby sealing ring 51 assures the airtight joint around piston rod 57.

When piston rod 57 has entered distributor block 18 in this manner, said adjustable stop 63 has influenced control valve 61 by means of the small wheel 64, thereby admitting compressed air into said passage 48 through valve 61 and by means of pipe 60 and through the hollow piston rods 59 and 57. At this moment the compressed air itself will also open valve 48, thus filling tank 53 through pipe 44 and admitting air pressure in air pressure cylinders 32 and 33 through pipe 42, valve 39, pipe 38, hand control valve 37 and pipe 36, thus clamping workpieces 34 and 35. Just before the concerned truck 1 is again displaced, cam 77 is again brought to its position shown in FIG. 8, whereby control valve 74 is inverted in such a way that compressed air which is fed through pipe 75 reaches space 68 above piston 56, through pipe 70, whereby the piston is displaced in opposite sense thus simultaneously retracting rod 57 out of distributor block 18 and releasing control valve 61.

When rod 57 is extracted from distributor block 45, nonreturn valve 52 provides, by means of spring 53, that no air can escape from tank 43.

By the release of control valve 61, air passage through rods 57 and 59 is shut off.

According to the invention, an injection of compressed air will preferably be given at each stop of truck 1 in the manner previously described, so that the dimensions of tank 43 can be held relatively small.

When the last operation has been carried out, actuating rod 40 of valve 39 is depressed by pressure cylinder 22 through pipe 36, manual valve 37, pipe 38 and exhaust opening 41, permitting the evacuation of the compressed air from cylinders 32 and 33, while simultaneously valve 39 provides that the connection between pipes 38 and 42 is temporarily interrupted in order to maintain tank 43 under pressure so as to limit the consumption of compressed air to a minimum.

At this time the finished parts 34 and 35 have been released so that they can be removed or pushed away automatically.

The normal position of manual valve 37 is open, and it has only been provided to facilitate the adjustment of the machine.

In this manner a device is provided which permits the pneumatic clamping of workpieces in transfer machines without the use of air hoses or the like which have to follow the movements.

It is quite obvious that the two workpieces shown in FIGS. 6 to 9 could also be clamped by means of one single jack, whereby the remainder of the device remains the same.

The present invention is by no means limited to the forms of embodiment described and shown in the drawings, but such a device can be built in any shape or dimensions without going beyond the scope of the present invention.

What I claim is:

1. Transfer machine including a plurality of movable workpiece carriers, on each of said movable workpiece carriers at least one distributor block, a pneumatic workpiece clamping means, an air reservoir, a release valve, and first series of pipes, and on a fixed part of said machine at least one connector, a source of pressurized air, a control element, and a second series of pipes, said distributor block being coupled with said workpiece clamping means through said first pipes and via said air reservoir and said release valve, and said connector being coupled with said source of pressurized air through said second pipes, said connector being adapted to co-operate with said distributor block to supply pressurized air from said source to said clamping means through said distributor block, said air reservoir and said release valve being adapted to co-operate with said control element to release pressure from said clamping means.

2. Transfer machine according to claim 1, wherein said release valve is coupled to said clamping means via a hand-operated valve.

3. Transfer machine according to claim 1, wherein said distributor block has a chamber coupled on the one hand with said air reservoir and on the other hand with a connection opening through a channel which is normally closed by a spring-controlled return valve, said connection opening having a peripheral groove wherein a sealing ring is mounted, said opening tapering towards said channel.

4. Transfer machine according to claim 3, wherein said connector includes a cylinder wherein is mounted a piston which is prolongated at both sides by a first and a second piston rods having central bores, said first piston rod being directed towards said movable carriers and having an extremity adapted to fit in said connection opening and said second piston rod being coupled to a first control valve coupled to said source of pressurized air and adapted to co-operate with an adjustable stop carried by said second piston rod, and wherein chambers at both sides of said piston are coupled to said source of pressurized air by a second control valve which is actuated by a programming cam in order to alternately supply pressurized air to said chambers.

* * * * *